United States Patent [19] [11] Patent Number: 4,703,360
Shor [45] Date of Patent: Oct. 27, 1987

[54] ELECTRONIC SLIDE PROJECTOR PROVIDING CHROMA AND LUMA INVERSION OF A COMPOSITE VIDEO SIGNAL

[76] Inventor: Ehud Shor, 19 Rehov Hameyasdim, Jerusalem, Israel

[21] Appl. No.: 843,782

[22] Filed: Mar. 25, 1986

[30] Foreign Application Priority Data

Mar. 25, 1985 [IL] Israel .......................................... 74711

[51] Int. Cl.⁴ .............................................. H04N 3/36
[52] U.S. Cl. ....................................... 358/214; 358/54
[58] Field of Search ................. 358/214, 228, 209, 54

[56] References Cited

U.S. PATENT DOCUMENTS 3,566,012 2/1971 Smithgall et al. ..................... 358/54
3,647,955 3/1972 Reader et al. ........................ 358/214
3,770,882 11/1973 Szymber ............................. 358/214
4,326,217 4/1982 Iwasawa et al. .................... 358/214
4,331,979 5/1982 Bendell ............................... 358/214
4,485,406 11/1984 Brownstein ......................... 358/214
4,495,516 1/1985 Moore et al. ......................... 358/54
4,506,300 3/1985 Fearnside ........................... 358/214

Primary Examiner—Gene Z. Rubinson
Assistant Examiner—Stephen Brinich
Attorney, Agent, or Firm—Abelman Frayne Rezac & Schwab

[57] ABSTRACT

Slide projection apparatus including video tube apparatus arranged for receiving by direct illumination thereon, light passing through a slide and apparatus for transmitting the electrical output from the video tube apparatus to a video display.

8 Claims, 5 Drawing Figures

ELECTRONIC SLIDE PROJECTOR PROVIDING CHROMA AND LUMA INVERSION OF A COMPOSITE VIDEO SIGNAL

FIELD OF THE INVENTION

The present invention relates to slide projectors generally and more particularly to slide projectors providing a video output.

BACKGROUND OF THE INVENTION

Conventional slide projectors have been known in the patent literature and on the marketplace for many years. Such projectors employ a powerful beam of light to project a real image of a slide onto a diffuse light reflecting surface, such as a screen or uniform wall surface.

With the widespread introduction of color television receivers into everyday use, it has been proposed to use a television receiver for display of slides, thereby obviating the need for a special screen or suitable reflecting surface for projection thereon and for darkening the room during the slide presentation.

A proposed system of this type is described in U.S. Pat. No. 4,331,979 wherein a still image produced by a slide is converted into a television signal by a solid state imager (CCD) device which is scanned across the image. Since frame storage is required for each color, a large amount of memory capacity is required, rendering the apparatus quite expensive and not suitable for use as a mass-marketed domestic appliance.

An alternative system of this type was described in U.S. Pat. No. 3,566,012 which employs a flying spot scanner which operates in conjunction with dichroic mirrors and suitable filters to separate the information derived from the scan into its representative color components which are then transmitted to the electrodes of the color cathode ray tube. This system is also complex and delicate due to the presence of the scanning apparatus and also due to the color separation employed thereby.

U.S. Pat. No. 3,770,882 describes a video reproduction system for photographic and other images wherein a television picture tube upon which the image is displayed is utilized as a flying spot scanner to emit pulsating beams to sample the image. A photo-detector is positioned to receive the light from the television tube which passes through or is reflected from the image. This system is no less complex or costly than those described hereinabove.

SUMMARY OF THE INVENTION

The present invention seeks to provide a relatively simple, reliable, high quality and low cost slide projection system which is suitable for use as a mass marketed home appliance.

There is thus provided in accordance with an embodiment of the present invention, slide projection apparatus including video tube apparatus arranged for receiving by direct illumination thereon, light passing through a slide and apparatus for transmitting the electrical output from the video tube apparatus to a video display.

In accordance with a preferred embodiment of the present invention, the slide projection apparatus also includes apparatus for enabling direct projection of color negatives including filter apparatus and apparatus for inverting the chroma and the luma outputs of the video tube apparatus.

Further in accordance with this embodiment of the present invention, apparatus is provided for illuminating the slide at different levels of illumination for positive and negative transparencies.

Additionally in accordance with an embodiment of the present invention, the video tube is located in the lens housing of a conventional non-video slide projector.

Further in accordance with an embodiment of the present invention, apparatus is provided for rotation of the projected image by means of mechanical rotation of the video tube relative to the transparency.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
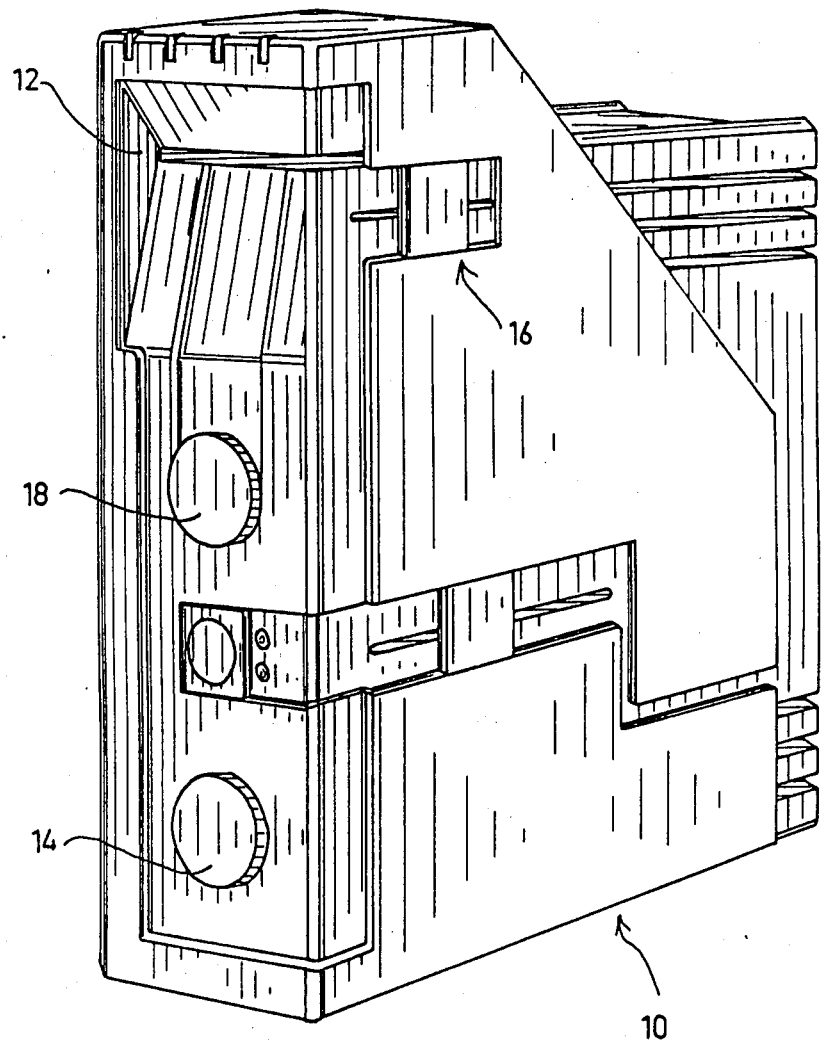
FIG. 1 is a pictorial illustration of the slide projection system constructed and operative in accordance with an embodiment of the present invention.

Reference is now made to FIG. 1 which illustrates a projection system constructed and operative in accordance with a preferred embodiment of the present invention. The projection system comprises a housing 10 defining a slide inlet slot 12 for insertion of a slide to be projected. Adjacent the slide inlet is provided a brightness control knob 14 for governing the brightness of the projected image. At the top surface of the housing is a positive-negative type slide reflector switch 16 and a tint control knob 18. Connectors providing a video output to a color television receiver or other suitable display device are at the back of the housing and are therefore not seen in FIG. 1.

Figure 2:
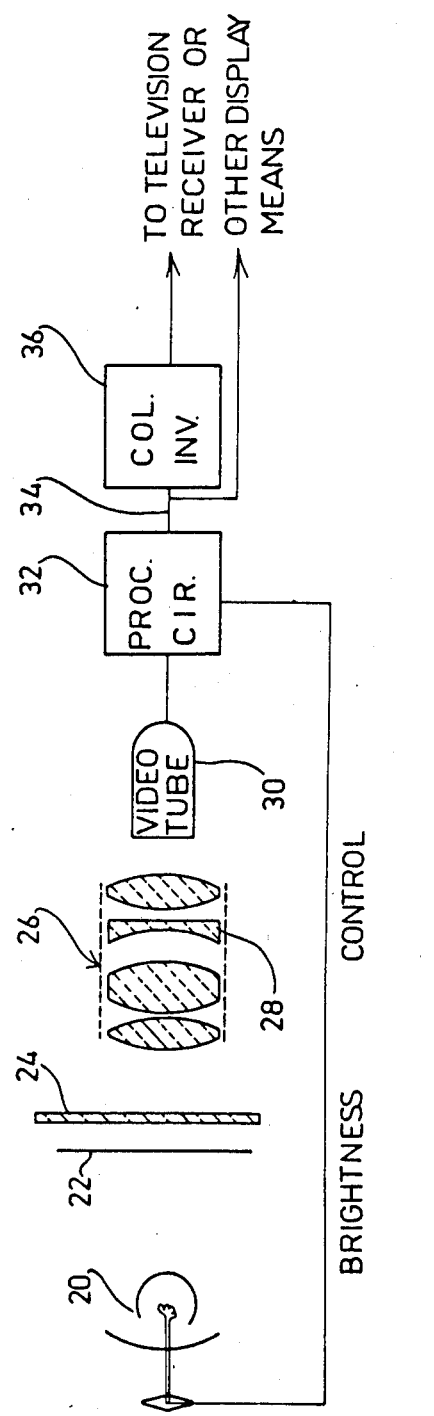
FIG. 2 is a diagrammatic illustration of the interior of the apparatus of FIG. 1.

Referring now to FIG. 2, there is seen a diagrammatic illustration of the system of FIG. 1. An illuminating lamp 20 shines light past a slide 22 to be illuminated. A selectably positionable blue tinted filter 24 filters the light received through the slide 22. It is noted that the blue tinted filter 24 is employed when it is sought to display a color negative slide and is not used when a positive slide is sought to be displayed.

An image of the illuminated slide 2 is formed by a zoom lens 26, typically including a movable lens element 28, on the face of a video picture tube 30, such as a Matsushita Newcosvicon S-4161. Electrical signals provided by the video picture tube 30 proceed by video processing circuitry 32 which generates a composite video signal at its output 34. Video processing circuitry 32 also provides a brightness control output signal which governs the intensity of lamp 20. Circuitry 32 is typically available from Tokyo Sanyo Electric Corp of Japan (Part No. LA7620).

Output 34 of processing circuitry 32 is supplied to a color inversion circuit 36 when negative slides are sought to be displayed. Color inversion circuit 36 provides an output to a television receiver or other suitable display means. When positive slides are sought to be displayed, the color inversion circuit 36 is bypassed and the output of circuitry 32 is supplied directly to the television receiver or other display means.

It is a particular feature of the present invention that the illumination of lamp 20 is adjusted as a function of whether a positive or negative slide is being displayed in order to compensate for the light loss at filter 24.

Figure 3:
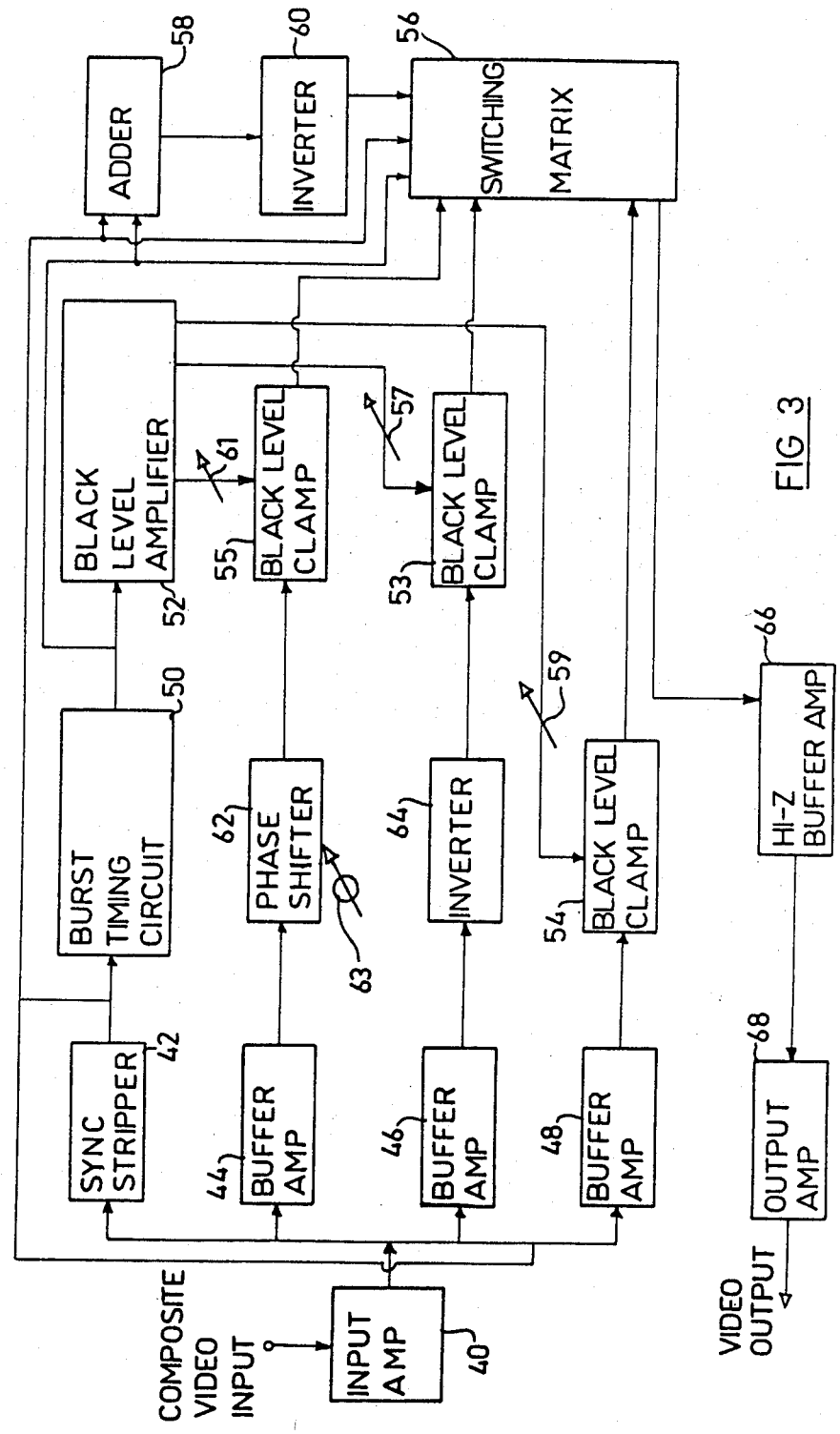
FIG. 3 is a block diagram illustration of the apparatus of FIG. 2.

Reference is now made to FIG. 3 which illustrates, in block diagram form, the color inversion circuit 36 of FIG. 2. Circuit 36 comprises an input amplifier 40 which receives the composite video input signal from processing circuitry 32 (FIG. 2) and provides four parallel outputs to a synchronizing signal stripper 42, and to two buffer amplifiers 44 and 46. Buffer amplifier 44 operates on the chroma part of the composite video signal, while buffer amplifier 46 operates on the luma portion of the composite video signal.

The output of synchronizing signal stripper 42 is supplied to a buffer amplifier 48 and to a burst timing circuit 50 and thence to a black level amplifier 52. Black level amplifier 52 outputs to black level clamps 53, 54 and 55 via suitable level controls 57, 59 and 61. Black level clamp 54 receives the output from buffer amplifier 48 and outputs to a switching matrix 56. The outputs of stripper 42 and of timing circuit 50 are also supplied to switching matrix 56 and to an adder 58 which outputs via an inverter 60 to switching matrix 56.

The output of buffer amplifer 44 is supplied to a chroma phase shifter 62 having a tint control 63 and which outputs to black level clamp 55, which in turn outputs to switching matrix 56. The output of buffer amplifier 46 is supplied to a luma inverter 64 which outputs to black level clamp 53, which in turn outputs to switching matrix 56.

The output of switching matrix 56 is supplied to a Hi −Z buffer amplifier 66 which outputs via an output amplifier 68 to the television receiver or other display (not shown).

Figure 4:
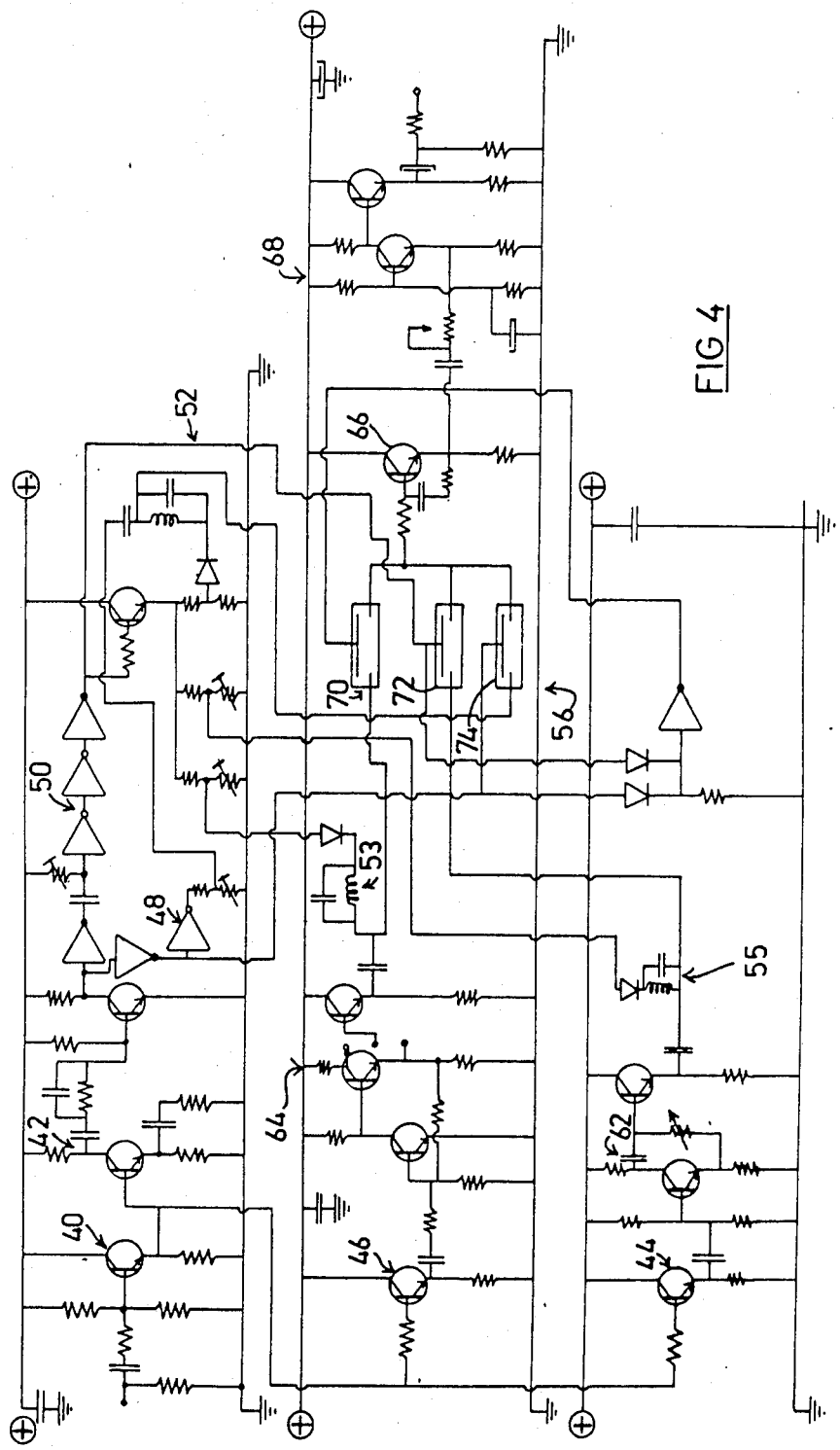
FIG. 4 is a schematic illustration of the circuitry embodied in the apparatus of FIG. 3.

Reference is now made to FIG. 4 which is a schematic illustration of the circuitry of FIG. 3. The video input from processing circuitry 32 is supplied via an input amplifier 40 to buffer amplifiers 44 and to sync stripper 42. The output of sync stripper 42 is supplied to the burst timing circuit 50 including a monostable circuit and to the black level amplifier 52.

Buffer amplifier 44 outputs via phase shifter and clamp 55 to switching matrix 56. Buffer amplifier 46 outputs via an inverter 64, including a negative/positive switch 16 (FIG. 1), and a black level clamp 53 to switching matrix 56. Switching matrix 56 includes a plurality of analog switches, including a switch 70 governing whether a video signal is inverted or not, a switch 72 governing the color burst timing and a switch 74 governing the synchronization timing.

The output of switching matrix 56 is provided via buffer 66 and output amplifier 68.

Figure 5:
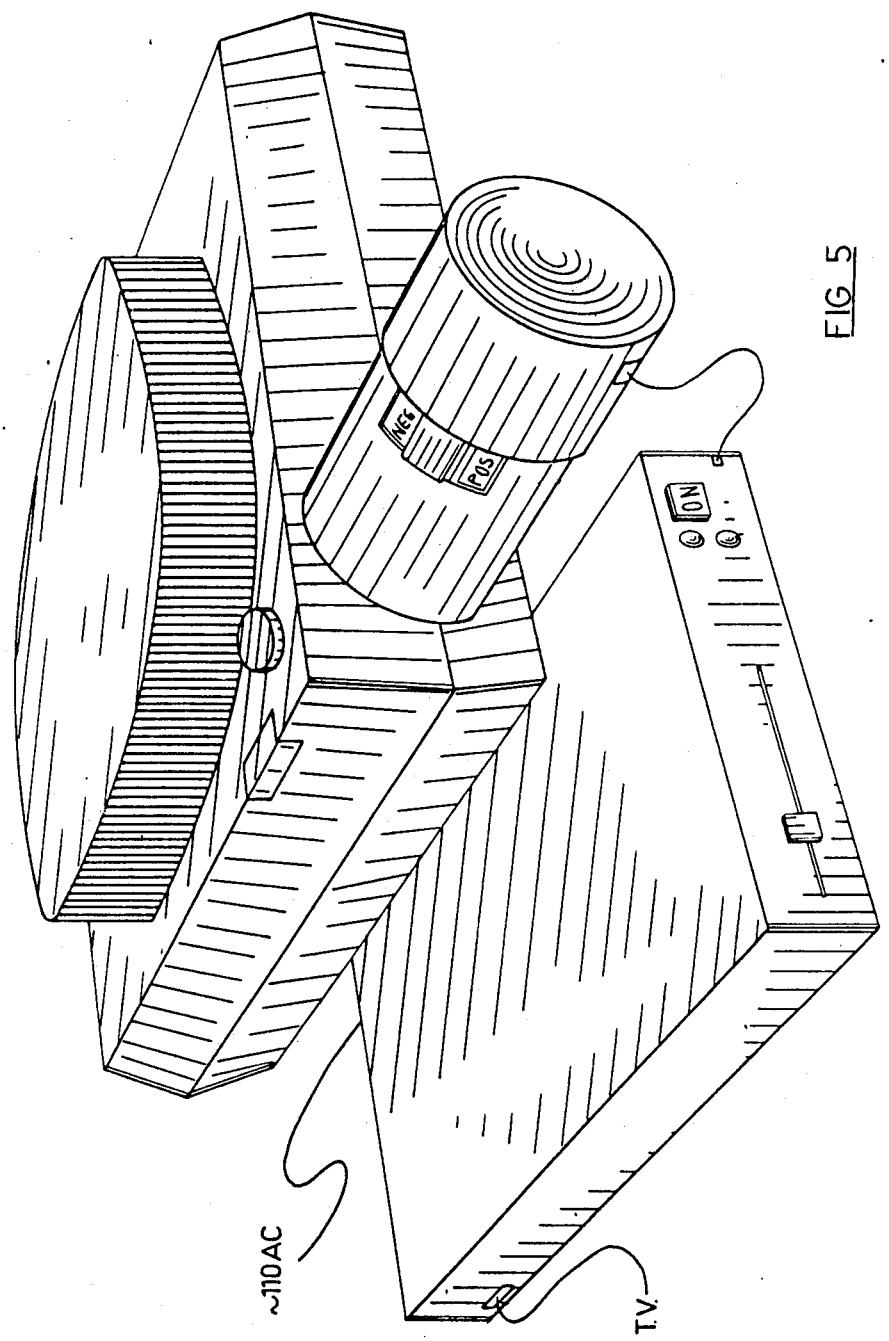
FIG. 5 is a pictorial illustration of the system constructed and operative in accordance with an alternative embodiment of the invention, wherein the video tube is incorporated within the lens housing of a conventional slide projector.

Reference is now made to FIG. 5 which illustates an alternative embodiment of the present invention wherein the video tube is incorporated within the lens housing of a conventional slide projector.

A further alternative embodiment of the apparatus employs the video tube of a conventional video camera which is coupled onto a conventional slide projector of the type shown in FIG. 5 by a suitable mechanical and optical coupling.

It will be appreciated by persons skilled in the art that the present invention is not limited by what has been particularly shown and described hereinabove. Rather the scope of the invention is only defined by the claims which follow:

I claim:

1. Color slide projection apparatus comprising:
   means for receiving a composite video output signal from video tube apparatus arranged for receiving by direct illumination thereon, light passing through a color transparency slide which may be either positive or negative;
   means for enabling selectable direct projection of a color negative transparency slide including
      blue tinted filter means selectably locatable along the light path from the slide to the input of said video tube apparatus for removing the effect of an orange substrate of color negative transparencies; and
      selectably energizable means for inverting the chroma and the luma portions of the composite video signal output of the video tube apparatus and
   means for transmitting the composite video signal output of the selectably energizable means to a video display.

2. Slide projection apparatus according to claim 1 and also comprising means for illuminating the slide at different levels of illumination for positive and negative transparencies.

3. Slide projection apparatus according to claim 1 and wherein said video tube is located in the lens housing of a conventional non-video tube slide projector.

4. Slide projection apparatus according to claim 2 and wherein said video tube is located in the lens housing of a conventional non-video tube slide projector.

5. Slide projection apparatus according to claim 1 and also comprising means for rotation of the projected image by means of mechanical rotation of the video tube relative to the transparency.

6. Slide projection apparatus according to claim 2 and also comprising means for rotation of the projected image by means of mechanical rotation of the video tube relative to the transparency.

7. Slide projection apparatus according to claim 2 and also comprising means for rotation of the projected image by means of mechanical rotation of the video tube relative to the transparency.

8. Color slide projection apparatus comprising:
   video tube apparatus located in the lens housing of a conventional non-video slide projector and being arranged for receiving by direct illumination, light passing through a color transparency slide which may be positive or negative;
   means for enabling selectable direct projection of color negatives including
      blue tinted filter means selectably locatable along the light path from the slide to the input of said video tube apparatus for removing the effect of orange substrate or color negative transparencies; and
      selectably energizable means for inverting the chroma and the luma portions of the composite video signal output of the video tube apparatus;

means for illuminating the color slide transparency at different levels of illumination for positive and negative transparencies;

means for selectable rotation of the said video tube relative to said transparency to provide desired rotation of a projected image thereof; and means for transmitting the composite video signal output of the selectably energizable means to a video display.

* * * * *